(12) United States Patent
Steiner

(10) Patent No.: US 10,708,251 B2
(45) Date of Patent: Jul. 7, 2020

(54) PORTABLE AUTHENTICATION AND ENCRYPTION DEVICE AND SYSTEM

(71) Applicant: Timothy Wayne Steiner, Pittsboro, NC (US)

(72) Inventor: Timothy Wayne Steiner, Pittsboro, NC (US)

(73) Assignee: Timothy Steiner, Pittsboro, NC (US)

( * ) Notice: Subject to any disclaimer, the term of this patent is extended or adjusted under 35 U.S.C. 154(b) by 299 days.

(21) Appl. No.: 15/665,336

(22) Filed: Jul. 31, 2017

(65) Prior Publication Data

US 2018/0034804 A1 Feb. 1, 2018

Related U.S. Application Data

(60) Provisional application No. 62/369,617, filed on Aug. 1, 2016.

(51) Int. Cl.
| | |
|---|---|
| *H04L 29/06* | (2006.01) |
| *H04L 9/32* | (2006.01) |
| *H04L 9/08* | (2006.01) |
| *G06F 21/34* | (2013.01) |
| *G06F 21/60* | (2013.01) |

(52) U.S. Cl.
CPC .......... *H04L 63/0807* (2013.01); *G06F 21/34* (2013.01); *G06F 21/602* (2013.01); *H04L 9/0869* (2013.01); *H04L 9/3234* (2013.01); *H04L 9/3247* (2013.01); *H04L 9/3271* (2013.01); *H04L 63/0853* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 2002/0038818 | A1* | 4/2002 | Zingher | G06K 9/00597 235/381 |
| 2003/0105964 | A1* | 6/2003 | Brainard | G06Q 20/32 713/178 |
| 2004/0205095 | A1* | 10/2004 | Gressel | G06F 7/582 708/253 |
| 2005/0122313 | A1* | 6/2005 | Ashby | G06F 3/0219 345/168 |
| 2005/0195170 | A1* | 9/2005 | Habu | G06F 3/0219 345/168 |

(Continued)

*Primary Examiner* — Kaveh Abrishamkar

(57) ABSTRACT

A portable electronic device for authentication and encryption communicably attached to a computer system is provided. The portable device may generate and automatically output authentication data for a plurality of accounts on request by a user. The output generated by the device is variable and customizable data that matches the data required by websites, applications, and other computer based systems to function as a universal authentication device. The device may include means to encrypt, decrypt, sign, verify and hash data including emails, images, documents and other files on request by a user. The device further having means to require physical user presence in order to generate authentication, encryption, decryption, signature, verification or hash data. The device includes a keypad having a plurality of buttons, a power and data connector, a data processing unit, a keyring hole, a light emitting diode, and a reset button.

20 Claims, 7 Drawing Sheets

(56) References Cited

U.S. PATENT DOCUMENTS

| | | | |
|---|---|---|---|
| 2006/0069706 A1* | 3/2006 | Lazich | G06F 7/588 |
| | | | 708/251 |
| 2006/0163349 A1* | 7/2006 | Neugebauer | G06Q 20/387 |
| | | | 235/383 |
| 2008/0015995 A1* | 1/2008 | Chen | G06F 21/32 |
| | | | 705/50 |
| 2008/0022061 A1* | 1/2008 | Ito | G11B 20/00086 |
| | | | 711/162 |
| 2008/0244730 A1* | 10/2008 | Ha | G06F 21/31 |
| | | | 726/17 |
| 2010/0331046 A1* | 12/2010 | Li | G06F 1/24 |
| | | | 455/556.2 |
| 2011/0079641 A1* | 4/2011 | Cantor | A61B 90/96 |
| | | | 235/375 |
| 2013/0048836 A1* | 2/2013 | Burt | G02C 7/101 |
| | | | 250/214 AL |
| 2013/0254117 A1* | 9/2013 | von Mueller | G06Q 20/3829 |
| | | | 705/71 |
| 2015/0056974 A1* | 2/2015 | Kim | G06F 9/451 |
| | | | 455/418 |
| 2018/0039582 A1* | 2/2018 | Kakutani | H04L 63/061 |
| 2019/0110200 A1* | 4/2019 | Hashimoto | H04W 12/06 |

* cited by examiner

PORTABLE AUTHENTICATION AND ENCRYPTION DEVICE AND SYSTEM

CROSS-REFERENCE TO RELATED APPLICATIONS

The present Utility patent application claims priority benefit of the U.S. provisional application for patent Ser. No. 62/369,617 entitled "Portable Authentication and Encryption Device" filed 2016 Aug. 1 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to portable electronic authentication devices. More particularly, the invention relates to a portable authentication and encryption device adapted to be attached to a computer, including a tablet or smartphone, through a physical connection or wireless connection.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that portable electronic authentication and encryption devices are well-known devices that are typically employed to perform encryption, decryption, signing, verifying and hashing functions and typically employed to authenticate a user via a cryptographic key stored on the device. However, portable electronic authentication devices may also be employed for other purposes. For example, without limitation, portable electronic authentication devices may be employed to generate and automatically output authentication data for a plurality of accounts on request by a user. The output data comprises information needed to login to an account including username, password, one-time password, and two-factor authentication data. The output generated by the device is variable and customizable data that matches the data required by websites, applications, and other computer based systems to function as a universal authentication device. The portable authentication and encryption device further having means to require physical user presence in order to generate authentication, encryption, decryption, signature, verification, or hash data. The portable electronic authentication devices further having means to encrypt, decrypt, sign, verify or hash data including emails, images, documents and other files on request by a user.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
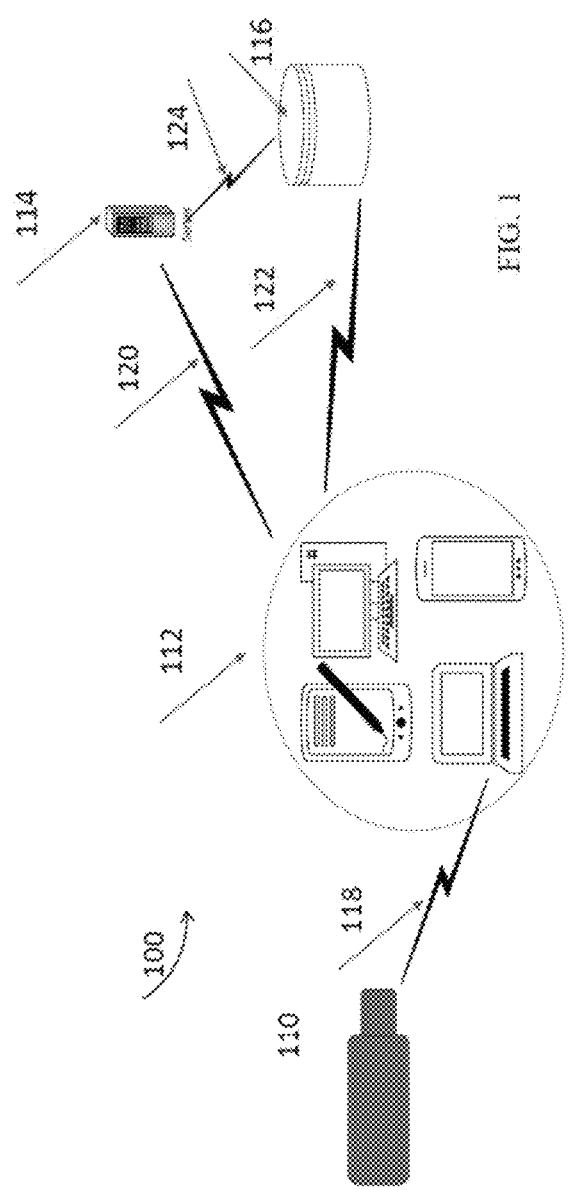
FIG. 1 illustrates a system including a portable authentication and encryption device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In one embodiment, present disclosure generally relates to a portable electronic authentication and encryption device. The portable electronic authentication and encryption device may include a keypad having a plurality of buttons attached to a face of the portable authentication and encryption device, a power and a data connector attached to a first end of the portable authentication and encryption device, a data processing unit attached to a face of the portable authentication and encryption device, a keyring hole attached to a second end of the portable authentication and encryption device, and a reset button attached to a face of the portable authentication and encryption device.

There has thus been outlined, in various exemplary embodiments, some of the features of the invention in order that the detailed description thereof may be better understood, and in order that the present contribution to the art may be better appreciated. There are additional features of the invention that are described hereinbelow.

It may be appreciated by a person with ordinary skill in the art, in light of and in accordance with the teachings of the present invention, that the invention is not limited in its application to the details of construction or to the arrangements of the components set forth in the following description or illustrated in the drawings. The invention may be capable of other embodiments and of being practiced and carried out in various ways as may be appreciated by a person with ordinary skill in the art. Also, it is to be understood that the phraseology and terminology employed herein are for the purpose of the description and should not be regarded as limiting.

In one embodiment, the present invention may include a portable authentication and encryption device adapted to be communicably attached to a computer system. The computer system may include, but not be limited to, a tablet or smartphone. The portable authentication and encryption device may be communicably attached to the computer system via a physical i.e., a wired connection or via a wireless connection. The portable authentication and encryption device may have means to generate and automatically output authentication data for a plurality of accounts on request by a user. The output data may include, but not be limited to, an information required to login to an account including, but not limited to, username, password, biometric (i.e., finger print read, iris/retina scan, etc. . . . ), and a two-factor authentication data. The output generated by the device may include variable and customizable data that matches the data required by websites, applications, and other computer based systems, for the portable authentication and encryption device to function as a universal authentication device.

In one embodiment, the present invention may include a portable authentication and encryption device enabled to protect sensitive information contained in the portable authentication and encryption device. The portable authentication and encryption device may be enabled by requiring a user to enter a pin code on the portable authentication and encryption device or a biometric verification on the portable authentication and encryption device prior to unlocking/retrieving the sensitive information. In one embodiment, protected sensitive information may include but is not limited to, encryption keys, authentication data, or other data the user desires to store and protect.

In one embodiment, the present invention may include a portable authentication and encryption device having means to require a physical user presence in order to generate authentication, encryption, decryption, signature, verification, or hash data. The portable electronic authentication device may enforce the physical user presence by requiring a user to place their finger on a capacitive touch button, biometric fingerprint reader, or activate a switch located on or communicably attached to the portable authentication and encryption device. By requiring the physical user presence, the portable authentication and encryption device may not be susceptible to malicious software on an attached computer that could simulate user presence through software on the computer to attempt to activate the device and perform authentication, encryption, decryption, signing, verifying, or hashing operations to compromise sensitive data. The portable authentication and encryption device may be better protected than smartcards currently available in the art, that utilize a computer keyboard (to which the smartcard may be communicably attached) for pin code entry to unlock the smartcard and then a software on the computer system, including malware, may be capable of accessing authentication, encryption, decryption, signing, verifying, or hashing operations in the smartcard.

In one embodiment, the present invention may include a portable authentication and encryption device that may provide additional protection through the method of/mechanism provided for pin code entry as the pin code is entered on the face of the portable authentication and encryption device itself and not on a keyboard attached to a computer system communicably attached to the portable authentication and encryption device. By requiring this out of band method of pin code entry the portable authentication and encryption device may not be susceptible to keyloggers on the computer system that may intercept pin code entry and use the intercepted pin code to access sensitive information. Accordingly, the portable authentication and encryption device may be better protected than current smartcards that may utilize a computer keyboard (to which the smartcard may be communicably attached) for pin code entry in the smartcard.

In one embodiment, the present invention may include a portable authentication and encryption device that may protect sensitive information contained in the portable authentication and encryption device by utilizing hardware security features that prevent an unauthorized party with physical access to the device from extracting sensitive information. In one embodiment, the hardware security feature may include, but is not limited to, disabling input and output from the portable authentication and encryption device's memory to prevent unauthorized access to device firmware, disabling reading or writing firmware to the device, and a physical tamper respondent enclosure that may wipe-Off sensitive information on detection of an attempt to access the device's memory.

In one embodiment, the present invention may include a portable authentication and encryption device that may protect sensitive information contained in the device by utilizing a designated computer software that may ensure that the portable authentication and encryption device may be unlocked through entering a pin code or a biometric verification. A plurality of failed attempts may result in the portable authentication and encryption device wiping-OFF all sensitive information.

In one embodiment, the present invention may include a portable authentication and encryption device that may store and generate authentication data for a plurality of user accounts.

In one embodiment, the present invention may include a portable authentication and encryption device that interfaces with a computer system in a way that it is indistinguishable from a native input device, for example, a built in keyboard or a USB keyboard, to the computer system the portable authentication and encryption device is connected to. The device may be more universally supported on standard computers than current smartcards as the portable authentication and encryption device may not require specialized drivers.

In one embodiment, the present invention may include a portable authentication and encryption device that interfaces with a computer system as a regular keyboard. The portable authentication and encryption device may then utilize this interface to type out information as if a user was typing it but at a rate faster than a user may be able to type out the information.

In one embodiment, the present invention may include a portable authentication and encryption device that may interface with a computer system like a regular keyboard. The portable authentication and encryption device may then utilize different keyboard profiles to enable a user to select different keyboard layouts and provide an interface that may be capable of operating in different international languages, i.e., provides a plurality of international keyboard profiles.

In one embodiment, the present invention may include a portable authentication and encryption device that may interface with a computer system like a regular keyboard. The portable authentication and encryption device may require a user presence to initiate a data backup and then type out the data to a backup text file on the computer system.

In one embodiment, the present invention may include a portable authentication and encryption device that may have the means to generate and automatically output two factor authentication data including time based one time passwords, hash based one time passwords, Universal 2nd Factor Authentication (U2F) registration messages, Universal 2nd Factor Authentication (U2F) authentication messages, and Yubico one time passwords.

In one embodiment, the present invention may include a portable authentication and encryption device that may protect sensitive information from forced disclosure by utilizing a self-destruct pin code. A user is enabled to set a self-destruct pin code when configuring the device. In an event, when the self-destruct pin code set by a user is entered by the user or an unauthorized party portable authentication and encryption device may erase and destroy the sensitive information stored on the portable authentication and encryption device. This gives the user an ability to erase and destroy the sensitive information stored on the portable authentication and encryption device easily and may be used if the user is forced to provide the pin code to the portable authentication and encryption device.

In one embodiment, the present invention may include a portable authentication and encryption device that may protect sensitive information from forced disclosure by utilizing a plausible deniability pin code. A user is able to set a plausible deniability pin code when configuring the portable authentication and encryption device. The plausible deniability pin code set by a user is entered to unlock the portable authentication and encryption device to a second profile that may generate an authentication information for accounts set up by the user to look legitimate but may be fake accounts designed for the purpose of the user having the ability to plausibly deny that there is any legitimate sensitive information stored on the device that has not already been disclosed. The legitimate sensitive information may be still stored on the device in a separate profile. Since there may not be a way to prove that the separate profile exists without going to extraordinary means, the user may be able to with a relatively high level of confidence have plausible deniability that the separate hidden profile exists.

In one embodiment, the present invention may include a portable authentication and encryption device that may have the means to generate truly random numbers by utilizing the capacitive touch readings of a user's skin and the capacitive touch readings of the air as a source of entropy. This source of entropy is combined with atmospheric noise generated by reading the values of hardware analog sources to produce a truly random number that may be suitable for use in cryptographic operations such as key generation.

In one embodiment, the present invention may include a portable authentication and encryption device that may be protected from unauthorized firmware loading by requiring a physical user presence. In various embodiments, the user may provide the required physical action by pressing a button or by placing a jumper between two touch points on the face of the device in order to enable loading of firmware. This may create an electrical circuit that first triggers a wipe of the current data on the data processing unit, which may include wiping sensitive user data such as encryption keys and authentication data, and secondly enables the data processing unit to load firmware. By requiring a user presence to place the jumper and enable loading of firmware the portable authentication and encryption device is protected from software vulnerabilities and malicious software that may attempt to load malicious firmware from a connected computer system.

In one embodiment, the present invention may include a portable authentication and encryption device that may be protected from software vulnerabilities and malicious software that may attempt to extract sensitive information from the In one embodiment, the present invention may include a portable authentication and encryption device while it is connected to a computer system by only permitting the connected computer to write data to the device or wipe data from the device. By not permitting the connected computer system to read the data back, once it has been written to the device, any malicious software running on the computer system may only wipe the data and would not be able to extract sensitive information.

In one embodiment, the present invention may include a portable authentication and encryption device that may utilize a plurality of algorithms for encryption, decryption, and signing including popular algorithms like Rivest-Shamir-Adleman (RSA), Eliptic Curve Cryptography (ECC), and American Encryption Standard (AES); and lesser known algorithms and future post-quantum computing algorithms like NewHope, NTRU Prime, and lattice-based cryptographic algorithms. In one embodiment, said data processing unit may encrypt, decrypt, sign, verify, or hash data using a plurality of cryptographic algorithms including new post quantum computing algorithms and output the data to said computer system using said data connectors and that the data comprises cryptographic currency transaction data including blockchain data, for example, bitcoin or other blockchain digital currency.

In one embodiment, after being unlocked the device may be used to encrypt, decrypt, sign, verify, or hash data sent to said device through said data connectors from a computer where user input of a unique challenge code may be required to be entered on said buttons to provide authorization where challenge code may be uniquely generated from data that both the computer and the device communicably connected to the computer share in common such as the data sent (decrypt, sign, verify, hash data), where user may be prompted from an application on communicably connected computer and displayed a challenge code to be entered on said communicably connected device where challenge code may be verified to ensure that the data being processed is the same data sent from the legitimate application and the request is authorized. A method of uniquely generating the same unique challenge code by both the device and the application may include generating a cryptographic hash of the data sent from the application to the device. The challenge code may be generated by the application for the purpose of visually prompting the user and generated by the device for the purpose of verification that data being received is the same data sent from the legitimate application and not data sent from malicious applications such as malware/virus. Accordingly, when device receives a request from communicably connected computer to encrypt, decrypt, sign, verify, or hash data a unique challenge code may be required to be typed on the device PIN pad in order to process the request. If the correct challenge code is entered the request may be processed by the device, if the incorrect challenge code is entered the request may be denied.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Turning now to the figures, in which similar reference characters denote similar elements throughout the several views.

Accordingly the figures illustrate a keypad having a plurality of buttons attached to a face of the portable authentication and encryption device, a power and data connector attached to a first end of the portable authentication and encryption device, a data processing unit attached to a face of the portable authentication and encryption device, a keyring hole attached to a second end of the portable authentication and encryption device, and a reset button attached to a face of the portable authentication and encryption device.

Referring to FIG. 1, is illustrated a system 100 including a portable authentication and encryption device, in accordance with an embodiment of the present invention. In an exemplary embodiment, the system 100 includes a portable authentication and encryption device 110 and a computer system 112. In certain embodiments, the system may include a server 114 and a database 116. The portable authentication and encryption device 110 is communicably connected 118 to the computer system 112, the computer system 112 is communicably connected 120 to the server 114 and the server 114 is communicably connected 122 to the database 116. A portable authentication and encryption device 110 may include a keypad, buttons, button labels, a key ring, a reset button, power connectors, and data connectors. A computer system 112 may be virtually any device or devices capable of receiving user input from the portable authentication and encryption device, processing and analyzing the input and take necessary actions. In exemplary embodiments, the computer system 112 may include a desktop computer, a laptop, a mobile phone, a smartphone, and the like devices that may be communicably connected to the portable authentication and encryption device 110. In certain embodiments, the computer system 112 may be communicably connected to the server 114 and to a database 116. Server 114 may be any computing platform that executes computer software and/or code from a non-transitory computer readable medium. Server 114 may also access a database 116 containing user information for authentication and encryption. In some embodiments, system 100 may comprise two or more portable authentication and encryption devices 110, and two or more servers 114 with databases 116. In some embodiments, portable authentication and encryption device 110 may communicate one or more input information to two or more servers 114. In a non-limiting example, portable authentication and encryption device 110 may communicate one or more input information to multiple servers 114 and polls the servers 114 to determine which server may respond with authentication and encryption required by the user.

It may be appreciated by a person with ordinary skill in the art, in light of and in accordance with the teachings of the present invention, that the portable authentication and encryption device may connect to any number of computer systems with virtually any wired and/or wireless means. The portable authentication and encryption device may connect to virtually any computer system by means such as, but not limited to, Bluetooth connection, Ethernet cable, USB cable, WI-FI, LI-FI, IRDA, etc. In an alternative embodiment of the present invention, a portable authentication and encryption device may send additional input information to a server and/or a smartphone device via a cellular connection.

It may be appreciated by a person with ordinary skill in the art, in light of and in accordance with the teachings of the present invention, a server 114 may be virtually any computing platform such as, but not limited to, a computer cluster, a laptop, a tablet, a smartphone, etc. In another embodiment of the present invention, server 114 may be a computer connected to a computer system 112 via a USB cable.

It may be appreciated by a person with ordinary skill in the art, in light of and in accordance with the teachings of the present invention, a database 116 may be virtually any data storage device or devices. Database 116 may be, but not limited to, a plurality of data servers, a memory card. In another embodiment of the present invention, database 116 may be a memory card connected to server 114.

It may be appreciated by a person with ordinary skill in the art, in light of and in accordance with the teachings of the present invention, that database 116 may contain virtually any data to improve the functionality of system 100. Database 116 may include, without limitation sensitive information security, code detectors, and the like.

Figure 2:
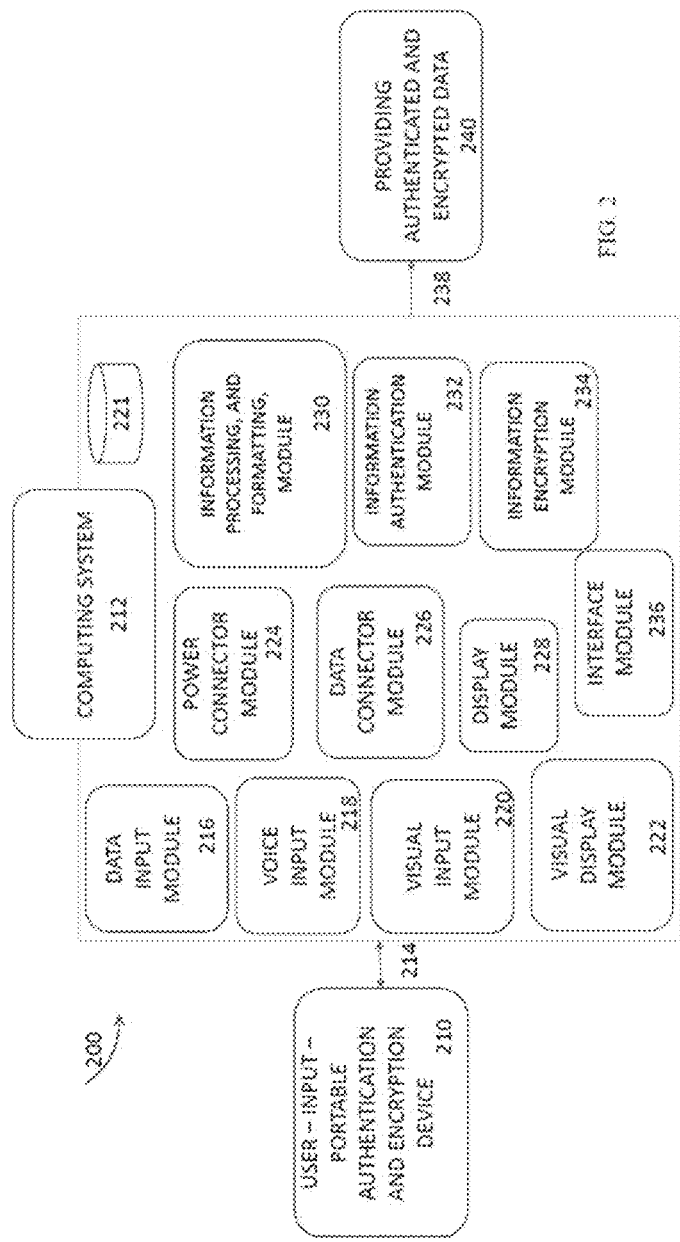
FIG. 2 illustrates an architecture 200 of an exemplary computing system including a portable authentication and encryption device, in accordance with an embodiment of the present invention.

FIG. 2 illustrates an architecture 200 of an exemplary computing system including a portable authentication and encryption device, in accordance with an embodiment of the present invention. The computing system 212 including a portable authentication and encryption device architecture 200 may comprise a data input module 216, voice input module 218, a visual input module 220, a visual display module 222, a power connector module 224, a data connector module 226, a display module 228, an information processing, and formatting module 230, an information authentication module 232, an information encryption module 234, a database 221, and an interface module 236. Data input module 216 may have a means of inputting data on a portable authentication and encryption device, such as, without limitation, sensors and/or a processing unit, and providing user data for authentication and encryption 240. A voice input module 218 may have a means of capturing data provided verbally, such as, without limitation, a portable authentication and encryption device having a voice recognizer or a voice/sound input acceptor, such as, without limitation, sensors and/or a processing unit, and providing user data for authentication and encryption 240. A visual input module 220 may have a means of capturing data provided visually, such as, without limitation, a portable authentication and encryption device having a visual input acceptor, such as, without limitation, sensors and/or a processing unit, and providing user data for authentication and encryption 240. A visual display module 222, may have a means of displaying visually, such as, without limitation, a portable authentication and encryption device having a visual display, such as, without limitation, sensors and/or a processing unit, and displaying user data for authentication and encryption 240. A power connector module 224, may have a means of providing power, such as, without limitation, a portable authentication and encryption device having a power connector, such as, without limitation, sensors and/or a processing unit, and providing power for powering the portable authentication and encryption device for providing user data for authentication and encryption 240. A data connector module 226, may have a means of transferring data, such as, without limitation, a portable authentication and encryption device having a data connector connected to a data processing unit, such as, without limitation, sensors and/or a processing unit, and providing data input for authentication and encryption of user data 240. A display module 228 may have a processing means such as, without limitation, a processing unit, a computer, or a server to execute computer code and/or algorithms from a non-transitory computer readable medium for providing a display to the user. Information processing and analyzing module 230 may have a means of processing a user input information such as, without limitation, a processing unit, a computer, or a server to execute computer code and/or algorithms from a non-transitory computer readable medium for data input for authentication and encryption of user data 240. Information authentication module 232 may have a means of authenticating user input information such as, without limitation, a processing unit, a computer, or a server to execute computer code and/or algorithms from a non-transitory computer readable medium for data input for authentication and encryption of user data 240. Information encryption module 234 may have a means of encrypting user input information such as, without limitation, a processing unit, a computer, or a server to execute computer code and/or algorithms from a non-transitory computer readable medium for 238 data input for authentication and encryption of user data 240. An interface module 236 may have a means to interface between the various modules, such as, without limitation, a processing unit, a computer, or a server to execute computer code and/or algorithms from a non-transitory computer readable medium for 238 data input for authentication and encryption of user data 240.

It may be appreciated by a person with ordinary skill in the art, in light of and in accordance with the teachings of the present invention, that one or more modules may be embodied in a single device. In an alternative embodiment of the present invention, all modules except the data input module, visual input module, and vocal input module, may be embodied in a smartphone device which would be capable of receiving data input for authentication and encryption of user data 240.

It may be appreciated by a person with ordinary skill in the art, in light of and in accordance with the teachings of the present invention, that virtually any algorithm and/or computer code may be used to recognize a visual input. visual recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from a visual input.

It may be appreciated by a person with ordinary skill in the art, in light of and in accordance with the teachings of the present invention, that virtually any algorithm and/or computer code may be used to recognize a vocal input. Vocal/sound recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from a vocal input.

It may be appreciated by a person with ordinary skill in the art, in light of and in accordance with the teachings of the present invention, that there may be a plurality of the same modules in the system including a portable authentication and encryption device architecture 200. A plurality of modules such as, without limitation, a data input module 216, voice input module 218, a visual input module 220, a visual display module 222, a power connector module 224, a data connector module 226, a display module 228, an information processing, and formatting module 230, an information authentication module 232, an information encryption module 234, a database 221, and an interface module 236 may be present in the system including a portable authentication and encryption device architecture 200. The plurality of similar modules may work in parallel or independently to improve the throughput and/or speed of the system including a portable authentication and encryption device architecture 200. In an alternative embodiment of the present invention, a plurality of data input modules, visual input modules, and vocal input modules, may be connected to the system including a portable authentication and encryption device via wired and wireless connections to access resources from different wired and wireless networks. In still another alternative embodiment of the present invention, a plurality of similar modules may form a secondary system including a portable authentication and encryption device capable of seamlessly substituting a messing and/or failing module.

It may be appreciated by a person with ordinary skill in the art, in light of and in accordance with the teachings of the present invention, that one or more modules may transmit error information to a tech support server that is on an accessible network or over the internet. In an alternative embodiment of the present invention, additional error information may be sent to a server to alleviate processing load on the system including a portable authentication and encryption device.

Figure 3:
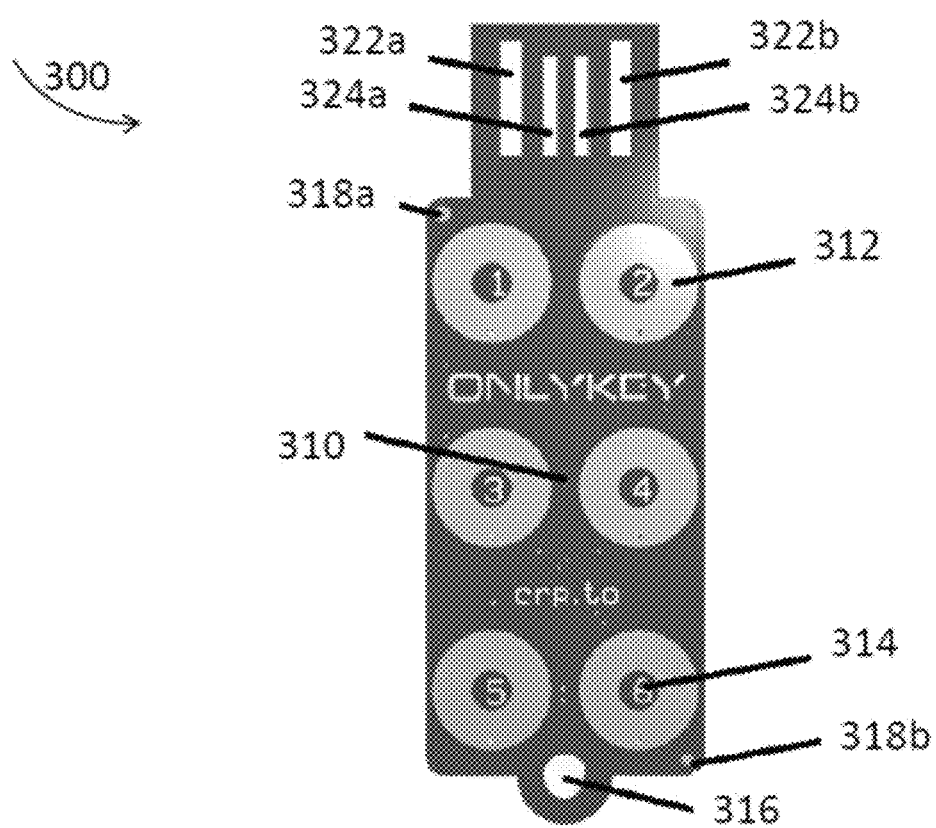
FIG. 3 illustrates a front elevation view of a portable authentication and encryption device, in accordance with an embodiment of the present invention.
Figure 4:
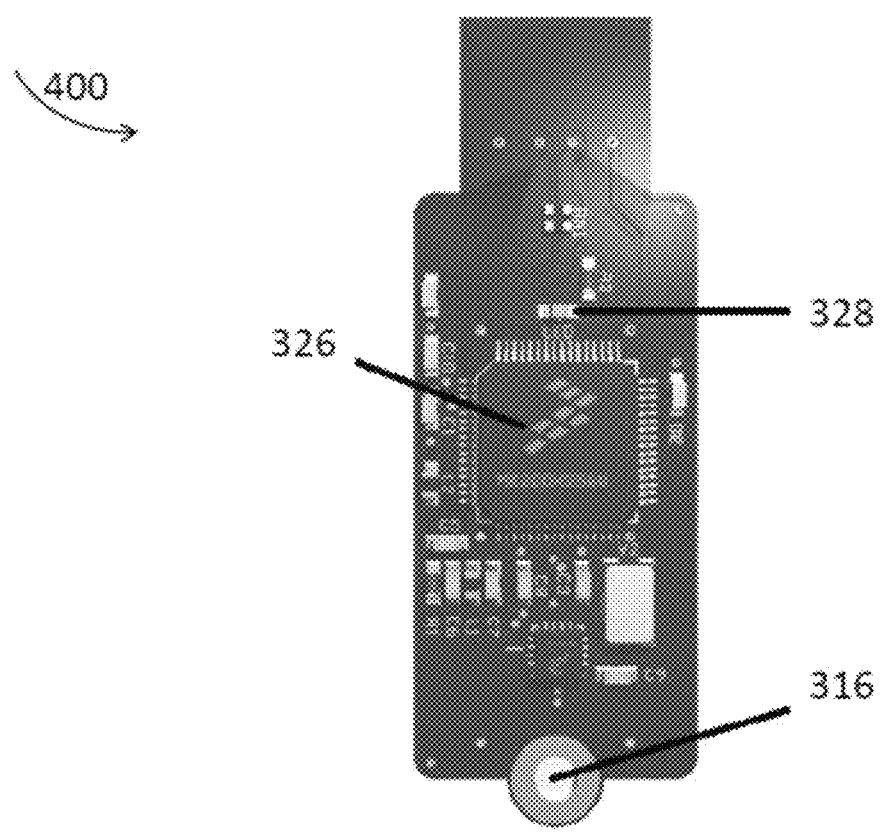
FIG. 4 illustrates a rear elevation view of a portable authentication and encryption device, in accordance with an embodiment of the present invention.
Figure 5:
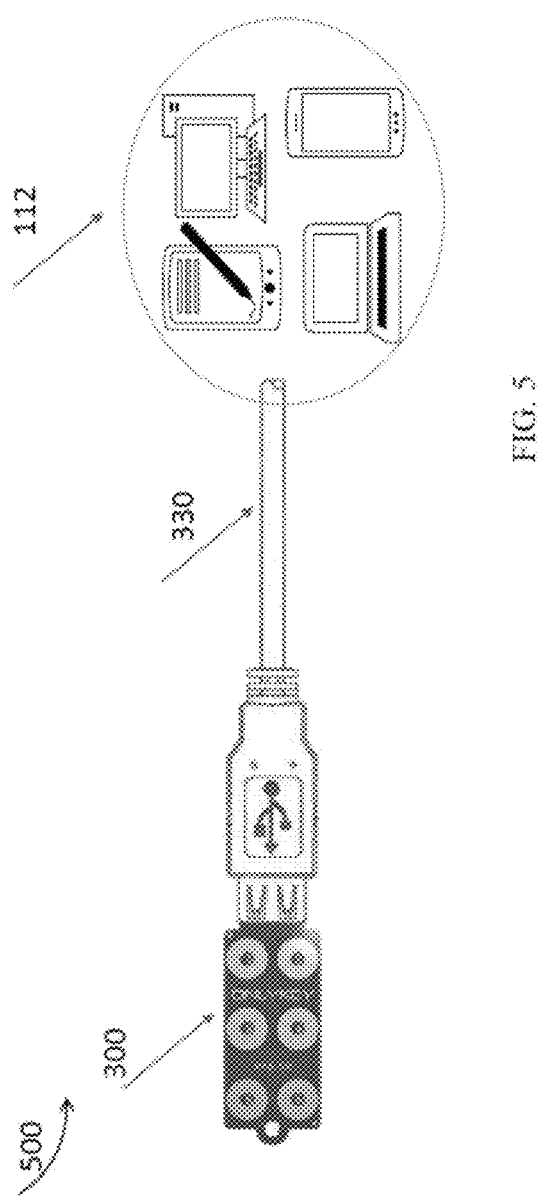
FIG. 5 illustrates a front elevation view of a portable authentication and encryption device attached to a USB port, in accordance with an embodiment of the present invention.

Referring to FIG. 3 is illustrated a front elevation view 300 of a portable authentication and encryption device, in accordance with an embodiment of the present invention. Referring to FIG. 4 is illustrated a rear elevation view 400 of a portable authentication and encryption device, in accordance with an embodiment of the present invention. Referring to FIG. 5 is illustrated a front elevation view 500 of a portable authentication and encryption device attached to a USB port, in accordance with an embodiment of the present invention. As shown in FIG. 3 the front elevation view 300 of the device includes a keypad 310, buttons 312, button labels 314, a key ring 316, a reset button 318a, 318b, power connectors 322a, 322b; and data connectors 324a, 324b. In one embodiment, the keypad 310 may be positioned on a face of the portable authentication and encryption device having a plurality of buttons 312. In one embodiment, the keypad 310 may include but not be limited to, capacitive touch buttons. The function of the keypad 310 is for a user to press the buttons 312. As shown with reference to FIG. 3 and FIG. 4, the buttons 312 may be connected to a data processing unit 326, which interprets the user key presses as data input. This user data input may serve as a method for entering a pin code that may unlock sensitive data stored in the data processing unit 326. The user data input may also serve as a method of communication with the data processing unit 326 and for providing input that may result in the data processing unit 326 providing corresponding output to a data connector 324 (shown as 324a, 324b in FIG. 3) that may be attached to a computer system connected to the portable authentication and encryption device. In alternative embodiments, a fingerprint reader may be provided on a face on the portable authentication and encryption device instead of or in addition to the keypad 310 to provide a visual input of a fingerprint. It may be appreciated by a person with ordinary skill in the art, in light of and in accordance with the teachings of the present invention, that electrical readings from a user's key presses may be employed to enter user information when the user presses the keys on the device, i.e., using readings from a user's skin in a manner similar to how a touch screen works, or for wiping off data in the device when the user activates the reset buttons. Accordingly, requiring a user to physically touch something is something malware/viruses cannot do and hence provides proof of user's physical presence. In one embodiment, the electrical readings from a user's key presses used as an input to random number generation may comprise measurable changes in capacitance by contact with said button or proximity between the user's finger and said button. It may be appreciated by a person with ordinary skill in the art, in light of and in accordance with the teachings of the present invention, that not only touch may be used to seed random number generator but even proximity to the button causes a measurable input to random number generator in certain embodiments.

In one embodiment, the buttons 312 may be positioned substantially far enough apart so that a user can easily press them with a finger without pressing multiple buttons. In one embodiment, the buttons 312 may be substantially large enough for a user to easily see and press a button. In one embodiment, the buttons 312 may include braille inscriptions to enable a visually challenged user to press a button.

In one embodiment, as indicated in FIG. 3 and FIG. 4, the portable authentication and encryption device may include a keyring hole 316 for receiving a ring, a lanyard, or similar structure. The function of the keyring 316 is for a user to attach the portable authentication and encryption device to a keychain or similar object. In various embodiments, the keyring hole 316 may be circular, rectangular, oblong, or similar in shape. In alternative embodiments, there may be a key chain, dongle, or other attachments to facilitate attaching the device for portability.

In one embodiment, as illustrated in FIG. 3, the portable authentication and encryption device may include a reset button 318a, 318b attached to a face of the portable authentication and encryption device. In one embodiment, the reset button 318a, 318b may have a function enabling a user to activate the reset button 318a, 318b in order to load a designated computer software onto the portable authentication and encryption device data processing unit 326. The reset button 318a, 318b may be communicably attached to the data processing unit 326 so that activating the reset button may permit a user to load the designated computer software onto the portable authentication and encryption device data processing unit through the data connectors 324a, 324b. In another embodiment, the reset button 318a, 318b may include a function that may enable a user to wipe sensitive data from the data processing unit 326 when the reset button 318a, 318b is activated. In one embodiment, activating the reset button 318a, 318b may be accomplished by touching a first end of a piece of a conductive material such as a jumper wire to the reset button 318a and a second end of the piece of conductive material to the reset button 318b to trigger a switch.

In one embodiment, the reset button 318a, 318b may include a conductive pad or a touch point comprised of any shape including circular, rectangular, or spherical. In another embodiment, the reset button 318a, 318b may be a physical button including a pushbutton, a toggle switch, and the like. In certain embodiments, the device 300 may include only one reset button either 318a or 318b.

In one embodiment, the portable authentication and encryption device may include a power connector 322a, 322b and a data connector 324a, 324b attached to a first end of the portable authentication and encryption device as shown with reference to FIG. 3. In one embodiment, the function of the power connector is to provide power to the data processing unit and the function of the data connector is to provide a data connection from the data processing unit to a computer system communicably connected to the portable authentication and encryption device. In one embodiment, the data connector may provide the data processing unit a connection to the computer system that may be detected by the computer as a human interface device (HID) at times herein referred to as a computer keyboard or a USB keyboard. The data connector may permit a user to press a key on the keypad 310 resulting in the pressing of a corresponding set of keys stored in the data processing unit 326, for input information to be sent to the computer communicably connected to the portable authentication and encryption device through the data connector 324a, 324b. In one embodiment, the data connector and power connector may include separate connectors i.e., power connector 322a, 322b and data connector 324a, 324b as shown in FIG. 3. It may be appreciated by a person with ordinary skill in the art, in light of and in accordance with the teachings of the present invention, that in certain embodiments, not shown in the figures, the power and data connectors may be combined. In an exemplary embodiment, a battery may be used to provide power. In an exemplary embodiment, the data connector may be connected wirelessly to the computer communicably connected to the portable authentication and encryption device via wireless connections including, but not limited to, Bluetooth® low energy (BLE), near field communication (NFC), Wi-Fi, or Zigbee.

In one embodiment, the data connector 324a, 324b may be comprised of a connector that may be commonly provided on computers, for example, universal serial bus (USB). In one embodiment, the connectors, such as, USB may contain data connectors 324a, 324b, negative power connector 322b, and positive power connector 322a in one connector together referred to herein as power and data connector.

In one embodiment, the portable authentication and encryption device includes a data processing unit 326. In one embodiment, the data processing unit 326 may be located on a face of the portable authentication and encryption device. The data processing unit 326 may comprise a processor that may be used to store, process, and transmit data. In one embodiment, the data processing unit 326 may function to process and store user input information that may be entered by a user on the connected keypad 310. In one embodiment, data processing unit 326 may function to process, store, transmit, and receive data from a computer system communicably connected through a connected data connector 324a, 324b.

In one embodiment, there may be multiple data processing units 326. In some embodiments, the functions of the data processing unit 326 may be broken into multiple parts such as a separate data storage unit connected to a data processing unit. In one embodiment, the data processing unit may generate and automatically output authentication data for a plurality of accounts to the computer system communicably connected to the device, using the data connectors, wherein the authentication data may include, but not be limited to, usernames, passwords, PIN codes, time based one time passwords, hash based one time passwords, Universal 2nd Factor Authentication (U2F) registration messages, Universal 2nd Factor Authentication (U2F) authentication messages, and the like, wherein the device basically types out usernames, passwords, etc, just as if a user typed them but instead automatically, because the device is seen by the computer as a keyboard.

In one embodiment, the portable authentication and encryption device may include a light emitting diode 328 attached to a face of the portable authentication and encryption device as shown with reference to FIG. 4. In one embodiment, the function of the light emitting diode 328 is to display light to a user or receiving device as instructed by the data processing unit 326. In one embodiment, the function of the light emitting diode 328 is providing light to a user I[TS1]as a form of communication. In certain embodiments, the LED may be used to send a message to a smartphone that may be received via a user's smartphone camera which may capture changes in light and convert the changes in light to a text message that may displayed to the user on the smartphone In various embodiments, the light emitting diode 328 may provide a display in various states of brightness including light turned off, light turned on, light blinking, light fading on, or light fading off. The light emitting diode 328 may display various colors including combinations of red, green, and blue light to make other colors. In certain embodiments, the light brightness and color of light can communicate visible recognizable information to the user as well as be used to encode data that may be recognizable to a light receiving device. In certain embodiments, data may be encoded and transmitted to a receiving system using varying brightness and colors of the light emitting diodes 328.

In another embodiment, the light emitting diode 328 may be positioned anywhere on the portable authentication and encryption device where it would provide a visible light to the user. Various colors may be used to provide additional communication.

In another embodiment, the light emitting diode 328 may be replaced with a different type of light emitting object that may be used to display visible, infrared, or ultraviolet light.

Referring back to FIG. 3 is illustrated connections of main elements and sub-elements of the portable authentication and encryption device 300 described herein. The buttons 312 may be attached to the keypad 310 as shown in FIG. 3 of the drawings. The button labels 314 are preferably positioned near the center of the buttons 312 as shown in FIG. 3 of the drawings. The keyring hole 316 may be connected to/disposed on an end of the keypad 310 as shown in FIG. 3/FIG. 4 of the drawings. The positive power connector 322a and a negative power connector 322b may be connected to an end of the keypad 310 which is opposite to the end where the keyring hole is disposed, as shown in FIG. 3 of the drawings. The data connector 324a, 324b may be connected to the first end of the keypad 310 as shown in FIG. 3 of the drawings. The keypad buttons 312 are connected to the data processing unit 326 as shown in FIG. 3 and FIG. 4 of the drawings. The keypad buttons 312 may have button labels 314 located in or around the button to identify it as shown in FIG. 3 of the drawings. The light emitting diode 328 may be connected to the data processing unit 326 as shown in FIG. 4 of the drawings. The body of the portable authentication and encryption device may include a keyring hole 316 as shown in FIG. 3 and FIG. 4.

In alternative embodiment, the keypad 310 may be comprised of an additional fingerprint reader on a face on the portable authentication and encryption device that is connected to the data processing unit 326 for authentication of users based on biometric fingerprint reading.

In an alternative embodiment, the keypad 310 may include of a visual display on a face on the portable authentication and encryption device that is connected to the data processing unit 326. This visual display may include a touch screen that permits user to input data by pressing the screen.

In another embodiment, a battery may be used to provide power to the portable authentication and encryption device and the power connector may be used to charge the battery.

In another embodiment, the data connector may be comprised of a wireless connection. Wireless connection may include Bluetooth low energy (BLE), Near Field Communication (NFC), Wi-Fi, Zigbee, or light.

During a typical working of the portable authentication and encryption device a user may first activate the portable authentication and encryption device 300 by inserting the power and data connectors 322a,322b,324a,324b into a USB port 330 that is connected to a computer system 112 (or mobile device) as shown in FIG. 5. When the positive power connector 322a and negative power connector 322b make a connection with the computer system power flows to the data processing unit 326. When the data connector 324a, 324b makes a connection with the computer data flows between the data processing unit 326 and the computer. The data processing unit 326 activates the light emitting diode 328 to provide a visual communication to the user. The data processing unit 326 receives the capacitive touch measurements of the buttons 312 located on the keypad 310. When a user presses the button 312 the electrical measurement of the button increases which is measured by the data processing unit 326 and registered as user input. The data processing unit 326 may activate the light emitting diode 328 on detecting a user key press. A user may input a pin code on the keypad 310 by pressing buttons 312. The correct combination of button presses will unlock the portable authentication and encryption device. It may be appreciated by a person with ordinary skill in the art, in light of and in accordance with the teachings of the present invention, that smartcards and tokens also require a PIN to unlock them but typically the PIN is typed on a computer system where a keylogger could capture the PIN. In the embodiments disclosed herein, the PIN must be entered on the device itself, separate from the computer system to which the device is communicably connected to, where no malware/virus/keylogger can see the PIN entered by the user. Once unlocked the user is able to press the buttons 312 which instructs the data processing unit 326 to send the data associated with the button pressed to the connected computer system 112. This data may include authentication data that logs a user into applications on the computer system 112 such as a web page authentication. In some embodiments, the user may also input a new pin code by utilizing an application to reset pin codes. When the power and data connectors 322a, 322b, 324a, 324b are removed the portable authentication and encryption device may automatically lock itself and may require the correct pin code the next time that the power and data connectors 322a, 322b, 324a, 324b are connected in order to unlock the portable authentication and encryption device. In an event that a plurality of incorrect pin codes are entered the portable authentication and encryption device may wipe off all sensitive data in the portable authentication and encryption device and return to a factory default state.

In one embodiment, a user may input a self-destruct pin code on an unlocked portable authentication and encryption device utilizing an application on the attached computer system 112 to set pin codes. The self-destruct pin code once set may be entered on a locked portable authentication and encryption device to wipe all sensitive data stored on the portable authentication and encryption device and return the portable authentication and encryption device to a factory default state.

In one embodiment, a user may input a plausible deniability pin code on an unlocked portable authentication and encryption device utilizing an application on the attached computer to set pin codes. The plausible deniability pin code once set may be entered on a locked portable authentication and encryption device to unlock the portable authentication and encryption device to what appears to be an unlocked state but is actually a second profile that does not have access to the data stored in the users actual profile. The second profile acts as a dummy profile if the user is ever forced to unlock their portable authentication and encryption device by an adversary. The plausible deniability pin code when entered may unlock the portable authentication and encryption device and appear to give the adversary access to the portable authentication and encryption device sensitive information but is actually non-sensitive information that the user must set to look like sensitive information.

In certain embodiments, while using the portable authentication and encryption device it may be necessary at times to load new firmware onto the data processing unit 326. The way the user may do this is to insert the portable authentication and encryption device into the computer system and utilize an application to load firmware. The reset button 318a, 318b would be activated by attaching a jumper between the reset button 318a, 318b and the reset button 318a, 318b. When the reset button 318a, 318b is activated it will wipe the current firmware from the data processing unit 326 and load the new firmware, which will also wipe all sensitive data from the portable authentication and encryption device.

In one embodiment, when firmware is first loaded the portable authentication and encryption device may require a user to go through an initial configuration to set a pin code the first time by utilizing an application to set pin codes. Once the pin code has been set a user must configure the data stored in the portable authentication and encryption device slots. As used herein the term "slot" may refer to a one data storage location that holds a plurality of values such as a username, password, and two factor authentication key.

In various embodiments, the portable authentication and encryption device may include a plurality of slots and may include multiple slots per button. In order to activate the data in a slot a user may press the button associated with that slot on an unlocked portable authentication and encryption device. Pressing the button for a short duration may activate one slot while pressing the same button for a longer duration may activate another slot. For example, a user pressing one of the buttons 312 which has a button label 314 of one for less than one second may activate a first slot. A user pressing one of the buttons 312 which has a button label 314 of one for more than one second may activate a second slot. A user pressing one of the buttons 312 which has a button label 314 of two for less than one second may activate a third slot. A user pressing one of the buttons 312 which has a button label 314 of two for more than one second may activate a fourth slot. In the exemplary portable authentication and encryption device shown in FIG. 3, since each of the buttons 312 has two slots, a keypad 310 with six buttons would have twelve possible slots. Further, in this example if the user unlocks the portable authentication and encryption device with the plausible deniability pin code instead of the regular pin code there would be an additional twelve possible slots for a total of twenty-four slots.

In addition to authentication, the portable authentication and encryption device may also perform the functions of encryption, decryption, signing, verifying, and hashing of data. This may accomplished with cryptographic keys including symmetric cryptographic keys such as American Encryption Standard (AES) and asymmetric cryptographic keys such as Rivest-Shamir-Adleman (RSA) and Eliptic Curve Cryptography (ECC) keys. However, other cryptographic key types may be used including post-quantum computing cryptographic keys.

A user may input a pin code on the keypad 310 by pressing buttons 312. The correct combination of button presses will unlock the portable authentication and encryption device. Once unlocked, the user is able to encrypt, decrypt, sign, verify and hash data sent to the device through the data connectors 324a, 324b from a connected computer. User input of a unique challenged code may be required to be entered on the buttons 312 to provide authorization where challenge code may be uniquely generated from data that both the computer 112 and the data processing unit 326 share in common such as the data sent by the computer and the same data received by the data processing unit (decrypt, sign, verify, hash request data). User may be prompted from an application on computer 112 and displayed a challenge code to be entered on device buttons 312 where challenge code may be verified by data processing unit 326 prior to performing requested operation (decrypt, sign, verify, or hash operation) to match the challenge code generated on the data processing unit 326. This is to ensure that the request data received is the same request data that was sent from the legitimate application. A method of uniquely generating the same unique challenge code by deriving the unique challenge code from a cryptographic hash of the request data. The application on the computer 112 may generate a cryptographic hash of the request data sent, and derive a unique challenge code from the hash. In the same way the data processing unit 326 may generate a cryptographic hash of the request data received, and derive a unique challenge code from the hash. The unique challenge code may be generated by the application for the purpose of visually prompting the user and generated by the data processing unit for the purpose of verification that data being received is the same data sent from the legitimate application and not request data sent from malicious applications such as malware/virus or modified request data. If the user enters the correct challenge code on the device buttons 312 this authorizes the data processing unit 326 to use the requested cryptographic key to encrypt, decrypt, sign, verify, or hash the corresponding request data. If the incorrect challenge code is entered the request may be denied. The challenge code provides security benefits over other methods by proving a physical user's presence by requiring that the buttons 312 are pressed and assures that the data being encrypted, decrypted, signed, verified, or hashed is legitimate and the data to encrypt, decrypt, sign, verify, or hash was the same data that was sent from the application that displayed the challenge code to the user.

In various embodiments, the system including the portable authentication and encryption device may have advantages as provided herein below. In one embodiment, the device may be a write only device. By having the device be write only, the computer can't read from it meaning that malware/virus on computer may be unable to do anything other than overwrite data on the device but may be unable to read sensitive information of the user from the device. In one embodiment, as mentioned herein above the device may include a feature to wipe data after multiple failed attempts at entering the user code. In one embodiment, as mentioned herein above the device may include a feature wherein a specific code when entered wipes off all data in the device. In one embodiment, as mentioned herein above the device may enforce user presence to provide the key press on an unlocked device to initiate back of the device that may provide an output including an encrypted backup data to the computer system communicably connected to the device. In one embodiment, as mentioned herein above the device may include a light emitting diode that may transmit data using variations in light color, brightness, and frequency. Those skilled in the art will readily recognize, in light of and in accordance with the teachings of the present invention that this technology is known as Li-Fi. In one embodiment, the device may include a feature of automatically locking itself after a period of inactivity which comprises of a timer running on said data processing unit that locks after a set period of time passes without a user key press. It may be appreciated by a person with ordinary skill in the art, in light of and in accordance with the teachings of the present invention, that the data connectors disclosed herein with reference to the device permit connection to a computer without additional drivers and interface with a computer as a regular keyboard unlike smartcards and tokens that may need complicated drivers.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 6:
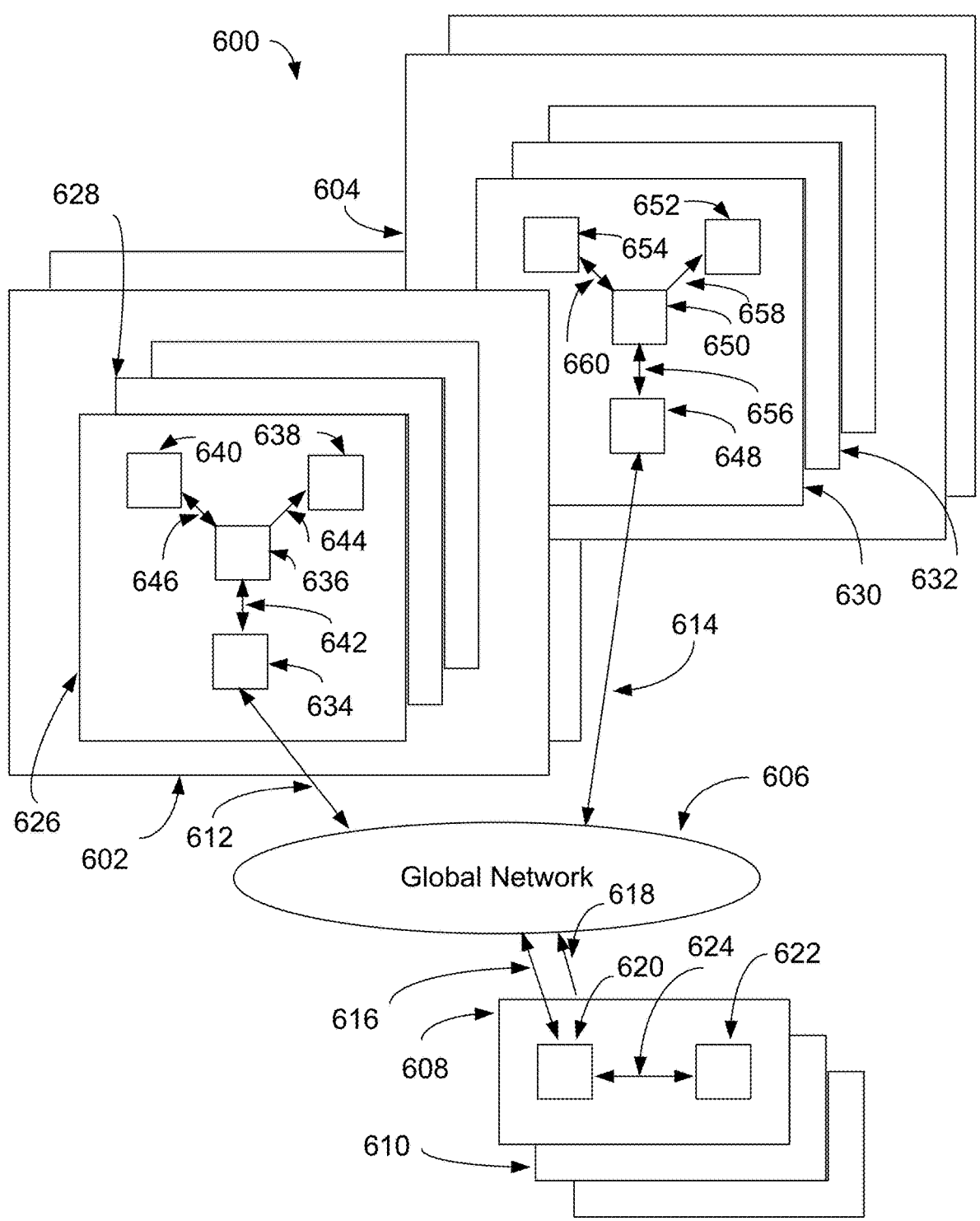
FIG. 6 illustrates a block diagram depicting a conventional client/server communication system, which may be used by an exemplary web-enabled/networked embodiment of the present invention.

FIG. 6 illustrates a block diagram depicting a conventional client/server communication system, which may be used by an exemplary web-enabled/networked embodiment of the present invention.

A communication system 600 includes a multiplicity of networked regions with a sampling of regions denoted as a network region 602 and a network region 604, a global network 606 and a multiplicity of servers with a sampling of servers denoted as a server device 608 and a server device 610.

Network region 602 and network region 604 may operate to represent a network contained within a geographical area or region. Non-limiting examples of representations for the geographical areas for the networked regions may include postal zip codes, telephone area codes, states, counties, cities and countries. Elements within network region 602 and 604 may operate to communicate with external elements within other networked regions or within elements contained within the same network region.

In some implementations, global network 606 may operate as the Internet. It will be understood by those skilled in the art that communication system 600 may take many different forms. Non-limiting examples of forms for communication system 600 include local area networks (LANs), wide area networks (WANs), wired telephone networks, cellular telephone networks or any other network supporting data communication between respective entities via hardwired or wireless communication networks. Global network 606 may operate to transfer information between the various networked elements.

Server device 608 and server device 610 may operate to execute software instructions, store information, support database operations and communicate with other networked elements. Non-limiting examples of software and scripting languages which may be executed on server device 608 and server device 610 include C, C++, C# and Java.

Network region 602 may operate to communicate bi-directionally with global network 606 via a communication channel 612. Network region 604 may operate to communicate bi-directionally with global network 606 via a communication channel 614. Server device 608 may operate to communicate bi-directionally with global network 606 via a communication channel 616. Server device 610 may operate to communicate bi-directionally with global network 606 via a communication channel 618. Network region 602 and 604, global network 606 and server devices 608 and 610 may operate to communicate with each other and with every other networked device located within communication system 600.

Server device 608 includes a networking device 620 and a server 622. Networking device 620 may operate to communicate bi-directionally with global network 606 via communication channel 616 and with server 622 via a communication channel 624. Server 622 may operate to execute software instructions and store information.

Network region 602 includes a multiplicity of clients with a sampling denoted as a client 626 and a client 628. Client 626 includes a networking device 634, a processor 636, a GUI 638 and an interface device 640. Non-limiting examples of devices for GUI 638 include monitors, televisions, cellular telephones, smartphones and PDAs (Personal Digital Assistants). Non-limiting examples of interface device 640 include pointing device, mouse, trackball, scanner and printer. Networking device 634 may communicate bi-directionally with global network 606 via communication channel 612 and with processor 636 via a communication channel 642. GUI 638 may receive information from processor 636 via a communication channel 644 for presentation to a user for viewing. Interface device 640 may operate to send control information to processor 636 and to receive information from processor 636 via a communication channel 646. Network region 604 includes a multiplicity of clients with a sampling denoted as a client 630 and a client 632. Client 630 includes a networking device 648, a processor 650, a GUI 652 and an interface device 654. Non-limiting examples of devices for GUI 638 include monitors, televisions, cellular telephones, smartphones and PDAs (Personal Digital Assistants). Non-limiting examples of interface device 640 include pointing devices, mousse, trackballs, scanners and printers. Networking device 648 may communicate bi-directionally with global network 606 via communication channel 614 and with processor 650 via a communication channel 656. GUI 652 may receive information from processor 650 via a communication channel 658 for presentation to a user for viewing. Interface device 654 may operate to send control information to processor 650 and to receive information from processor 650 via a communication channel 660.

For example, consider the case where a user interfacing with client 626 may want to execute a networked application. A user may enter the IP (Internet Protocol) address for the networked application using interface device 640. The IP address information may be communicated to processor 636 via communication channel 646. Processor 636 may then communicate the IP address information to networking device 634 via communication channel 642. Networking device 634 may then communicate the IP address information to global network 606 via communication channel 612. Global network 606 may then communicate the IP address information to networking device 620 of server device 608 via communication channel 616. Networking device 620 may then communicate the IP address information to server 622 via communication channel 624. Server 622 may receive the IP address information and after processing the IP address information may communicate return information to networking device 620 via communication channel 624. Networking device 620 may communicate the return information to global network 606 via communication channel 616. Global network 606 may communicate the return information to networking device 634 via communication channel 612. Networking device 634 may communicate the return information to processor 636 via communication channel 642. Processor 666 may communicate the return information to GUI 668 via communication channel 644. User may then view the return information on GUI 638.

Figure 7:
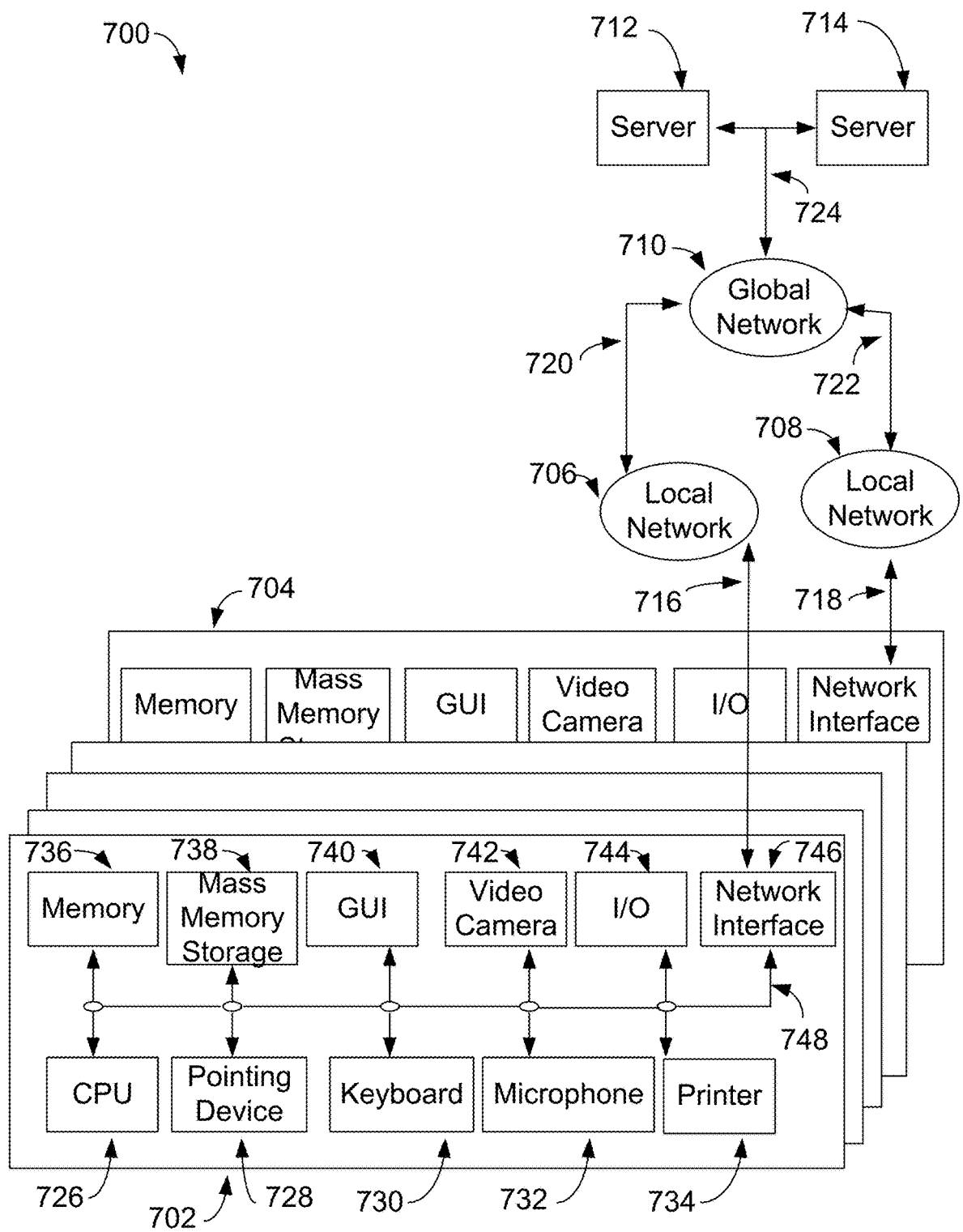
FIG. 7 is a block diagram depicting an exemplary client/server system which may be used by an exemplary web-enabled/networked embodiment of the present invention.

FIG. 7 is a block diagram depicting an exemplary client/server system which may be used by an exemplary web-enabled/networked embodiment of the present invention.

A communication system 700 includes a multiplicity of clients with a sampling of clients denoted as a client 702 and a client 704, a multiplicity of local networks with a sampling of networks denoted as a local network 706 and a local network 708, a global network 710 and a multiplicity of servers with a sampling of servers denoted as a server 712 and a server 714.

Client 702 may communicate bi-directionally with local network 706 via a communication channel 716. Client 704 may communicate bi-directionally with local network 708 via a communication channel 718. Local network 706 may communicate bi-directionally with global network 710 via a communication channel 720. Local network 708 may communicate bi-directionally with global network 710 via a communication channel 722. Global network 710 may communicate bi-directionally with server 712 and server 714 via a communication channel 724. Server 712 and server 714 may communicate bi-directionally with each other via communication channel 724. Furthermore, clients 702, 704, local networks 706, 708, global network 710 and servers 712, 714 may each communicate bi-directionally with each other.

In one embodiment, global network 710 may operate as the Internet. It will be understood by those skilled in the art that communication system 700 may take many different forms. Non-limiting examples of forms for communication system 700 include local area networks (LANs), wide area networks (WANs), wired telephone networks, wireless networks, or any other network supporting data communication between respective entities.

Clients 702 and 704 may take many different forms. Non-limiting examples of clients 702 and 704 include personal computers, personal digital assistants (PDAs), cellular phones and smartphones.

Client 702 includes a CPU 726, a pointing device 728, a keyboard 730, a microphone 732, a printer 734, a memory 736, a mass memory storage 738, a GUI 740, a video camera 742, an input/output interface 744 and a network interface 746.

CPU 726, pointing device 728, keyboard 730, microphone 732, printer 734, memory 736, mass memory storage 738, GUI 740, video camera 742, input/output interface 744 and network interface 746 may communicate in a unidirectional manner or a bi-directional manner with each other via a communication channel 748. Communication channel 748 may be configured as a single communication channel or a multiplicity of communication channels.

CPU 726 may be comprised of a single processor or multiple processors. CPU 726 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 736 is used typically to transfer data and instructions to CPU 726 in a bi-directional manner. Memory 736, as discussed previously, may include any suitable computer-readable media, intended for data storage, such as those described above excluding any wired or wireless transmissions unless specifically noted. Mass memory storage 738 may also be coupled bi-directionally to CPU 726 and provides additional data storage capacity and may include any of the computer-readable media described above. Mass memory storage 738 may be used to store programs, data and the like and is typically a secondary storage medium such as a hard disk. It will be appreciated that the information retained within mass memory storage 738, may, in appropriate cases, be incorporated in standard fashion as part of memory 736 as virtual memory.

CPU 726 may be coupled to GUI 740. GUI 740 enables a user to view the operation of computer operating system and software. CPU 726 may be coupled to pointing device 728. Non-limiting examples of pointing device 728 include computer mouse, trackball and touchpad. Pointing device 728 enables a user with the capability to maneuver a computer cursor about the viewing area of GUI 740 and select areas or features in the viewing area of GUI 740. CPU 726 may be coupled to keyboard 730. Keyboard 730 enables a user with the capability to input alphanumeric textual information to CPU 726. CPU 726 may be coupled to microphone 732. Microphone 732 enables audio produced by a user to be recorded, processed and communicated by CPU 726. CPU 726 may be connected to printer 734. Printer 734 enables a user with the capability to print information to a sheet of paper. CPU 726 may be connected to video camera 742. Video camera 742 enables video produced or captured by user to be recorded, processed and communicated by CPU 726.

CPU 726 may also be coupled to input/output interface 744 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 726 optionally may be coupled to network interface 746 which enables communication with an external device such as a database or a computer or telecommunications or internet network using an external connection shown generally as communication channel 716, which may be implemented as a hardwired or wireless communications link using suitable conventional technologies. With such a connection, CPU 726 might receive information from the network, or might output information to a network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a system including a portable authentication and encryption device according to the present invention will be apparent to those skilled in the art. Various aspects of the invention have been described above by way of illustration, and the specific embodiments disclosed are not intended to limit the invention to the particular forms disclosed. The particular implementation of the system including a portable authentication and encryption device may vary depending upon the particular context or application. By way of example, and not limitation, the system including a portable authentication and encryption device described in the foregoing were principally directed to implementations for a portable authentication and encryption device coupled with a computer; however, similar techniques may instead be applied to a portable authentication and encryption device coupled with an automobile, building, vault or other computer connected structure which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system, comprising;
    a computer, in which said computer comprises at least one of, a desktop computer, a laptop or notebook computer, a mobile phone, and a smartphone;
    a portable authentication and encryption device, said authentication and encryption device is configured to communicably connect to said computer, wherein said computer is configured to send data to or receive data from said portable authentication and encryption device;

a data processing unit, said data processing unit is configured to at least one of store, process, transmit and receive data to or from said computer;

a light emitting diode, wherein said light emitting diode being configured to provide visible light in a plurality of colors as a form of communication;

a keypad disposed on said portable authentication and encryption device, said keypad comprises;

a plurality of buttons, said plurality of buttons comprise a plurality of capacitive touch buttons, wherein a change in a capacitive touch measurement of each of said plurality of capacitive touch buttons is configured to indicate an input or key press;

wherein said data processing unit is further configured to activate said light emitting diode on a capacitive touch button upon detecting said change in a capacitive touch measurement of each of said plurality of capacitive touch buttons;

at least one label disposed per capacitive touch button, wherein pressing the same capacitive touch button for a predetermined amount of time is configured to be operable for activating at least one function;

an unlock pin code stored in a memory of said portable authentication and encryption device, said unlock pin code is entered using a combination of said plurality of capacitive touch buttons in said keypad, wherein said unlock pin code is configured to unlock said portable authentication and encryption device, or authenticate a user;

a keyring hole or attachment portion, said keyring hole or attachment portion being configured to physically couple said portable authentication and encryption device to another object;

a pair of reset buttons, in which said pair of reset buttons comprises at least a first reset button and a second reset button;

wherein electrically connecting with a conductive material said first reset button to said second reset button is configured to at least one of, wipe off data from said portable authentication and encryption device and load firmware on said portable authentication and encryption device; and wherein said electrical connection with said conductive material of said first reset button to said second reset button is operable for activating a switch to at least one of, wipe off data from said portable authentication and encryption device and load firmware in said portable authentication and encryption device;

a plurality of connectors, said plurality of connectors being configured to communicably connect to said computer, in which said plurality of connectors comprises;

at least one or more power connectors configured to receive power from said computer; and at least one or more data connectors configured to send and receive data to or from said computer;

wherein said data processing unit is configured to at least one of store, process, transmit and receive data to or from said computer via said one or more data connectors;

wherein said data processing unit is further configured to determine an increase in electrical measurement of each of said plurality of capacitive touch buttons, and wherein said increase in electrical measurement is configured to register as input or key press by said data processing unit; and a self-destruct pin code stored in portable authentication and encryption device, wherein an entry of said self-destruct pin code is configured to be operable for wiping all sensitive data stored on said portable authentication and encryption device and return said portable authentication and encryption device to a predetermined default state.

2. The system of claim 1, wherein said electrical connection with said conductive material of said first reset button to said second reset button comprises touching a first end of said conductive material to the first reset button and touching a second end of said conductive material to the second reset button, and wherein said electrical connection of said first and second reset button with said conductive material is further configured to be operable for avoiding inadvertent pressing of a single reset button.

3. The system of claim 1, wherein if said unlock pin code is incorrect a plurality of times, the data stored on said portable authentication and encryption device is wiped off or said portable authentication and encryption device is locked.

4. The system of claim 1, wherein said unlock pin code unlocks a second profile that comprises fake accounts that provide a user with plausible deniability that the first profile exists when forced by an adversary to unlock the portable authentication and encryption device.

5. The system of claim 1, wherein said user input on said unlocked device initiates a backup of said portable authentication and encryption device that output encrypted backup data to said computer.

6. The system of claim 1, wherein said light emitting diode transmits data using variations in light color, brightness, and frequency, wherein said variations in light color, brightness, and frequency comprises encoded data that is recognizable information to a user or a light receiving device.

7. The system of claim 1, wherein said data connectors transmits and receives data as a regular keyboard and user is enabled to select from a plurality of international keyboard profiles.

8. The system of claim 1, wherein said portable authentication and encryption device locks automatically after a period of inactivity which comprises of a timer running on said data processing unit that locks after a set period of time passes without a user key press.

9. The system of claim 1, wherein said data processing unit encrypts, decrypts, signs, verifies or hashes data with a plurality of cryptographic algorithms and output the data to said computer using said data connectors.

10. The system of claim 1, wherein said data processing unit generates and automatically outputs authentication data for a plurality of accounts to said computer system using said data connectors including at least one of, usernames, passwords, PIN codes, time based one time passwords, hash based one time passwords, Universal 2nd Factor Authentication (U2F) registration messages, and Universal 2nd Factor Authentication (U2F) authentication messages.

11. The system of claim 1, wherein said data processing unit requires physical user presence comprising physical touch on said keypad and comprising pressing a plurality of said capacitive touch buttons to enter said unlock PIN code that is verified by said data processing unit and is required to be a correct PIN in order to output authentication, encryption, decryption, signature, or hash data.

12. The system of claim 1, wherein said data processing unit requires physical user presence which comprises biometric authentication including at least one of, an iris scan, and a fingerprint read.

13. The system of claim 1, wherein said data connectors permit connection to a computer without additional drivers and interface with a computer as a regular keyboard.

14. The system of claim 1, wherein said data processing unit encrypts, decrypts, signs, verifies, or hashes data using a plurality of cryptographic algorithms and output the data to said computer system using said data connectors and that the data comprises cryptographic currency transaction data including blockchain data.

15. The system of claim 1, wherein after being unlocked the portable authentication and encryption device is used to encrypt, decrypt, sign, verify, or hash data sent to said device through said data connectors from said computer communicably connected to the device by entering a unique challenged code on said buttons; wherein the challenge code is generated from said data on both the computer where the user is prompted to enter the challenge code and on said device where challenge code is verified to ensure only legitimate requests are processed.

16. The system of claim 1, wherein said electrical measurement from said input or key press comprises measurable changes in capacitance by contact with said button or proximity between the user's finger and said button, and wherein said electrical measurement from said user's key press is used as a seed to a random number generator.

17. A system comprising;
- a computer, in which said computer comprise at least one of, a desktop computer, a laptop or notebook computer, a mobile phone, and a smartphone;
- a portable electronic authentication and encryption device, said authentication and encryption device is configured to communicably connect to said computer;
- a data processing unit disposed in said portable authentication and encryption device, said data processing unit is configured to store, process, transmit data to or receive data from said computer;
- a light emitting diode, wherein said light emitting diode being configured to provide visible light in a plurality of colors as a form of communication;
- a keypad disposed on said portable authentication and encryption device, said keypad characterized by;
  - a plurality of buttons, said plurality of buttons comprise a plurality of capacitive touch buttons, wherein said data processing unit is further configured to detect a change in a capacitive touch measurement of each of said plurality of capacitive touch buttons;
  - wherein a change in a capacitive touch measurement of each of said plurality of capacitive touch buttons is configured to indicate an input or key press;
  - a label disposed per capacitive touch button, wherein pressing the same capacitive touch button for a predetermined amount of time is configured to be operable for activating at least one function;
  - a keyring hole or attachment portion configured to couple said device to another object;
  - a plurality of reset buttons, in which said plurality of reset buttons comprises at least a first reset button and a second reset button;
  - wherein electrically coupling with a jumper wire said first reset button to said second reset button is configured to be operable for triggering at least one of, wiping data off said portable authentication and encryption device and loading firmware on said portable authentication and encryption device; and
- a plurality of power and data connectors, said plurality of power and data connectors characterized by;
  - a plurality of power connectors configured to receive power; and
  - a plurality of data connectors configured to send and receive data.

18. The system of claim 17, wherein said data processing unit is further configured to determine an increase in electrical measurement of each of said plurality of capacitive touch buttons, and wherein said increase in electrical measurement is configured to register as user input by said data processing unit.

19. The system of claim 18, further comprising a self-destruct pin code stored in said portable authentication or encryption device, wherein an entry of said self-destruct pin code is configured to be operable for wiping all sensitive data stored on said portable authentication or encryption device and return said portable authentication or encryption device to a predetermined default state.

20. A system consisting of;
- a computer, in which said computer comprise at least one of, a desktop computer, a laptop or notebook computer, a mobile phone, and a smartphone;
- a portable authentication and encryption device, said authentication and encryption device is configured to communicably connect to said computer;
- a data processing unit disposed in said portable authentication and encryption device, said data processing unit is configured to store, process, transmit data to or receive data from said computer;
- a keypad disposed in said portable authentication and encryption device, said keypad comprises;
  - a plurality of capacitive touch buttons, said plurality of capacitive touch buttons being configured to capacitively receive user input;
  - wherein said data processing unit is further configured to determine said increase in electrical measurement of each of said plurality of capacitive touch buttons, and wherein said increase in electrical measurement is configured to register as user-input by said data processing unit;
  - at least one label per capacitive touch button, wherein pressing the same capacitive touch button for a predetermined amount of time is configured to be operable for activating at least one function;
  - a keyring hole or attachment configured to couple said device to another object;
  - a plurality of reset buttons, in which said plurality of reset buttons comprise at least a first reset button and a second reset button;
  - wherein electrically connecting with a conductive material said first reset button to said second reset button is configured to trigger or activate at least one of, wipe data off from said portable authentication and encryption device and load firmware on said portable authentication and encryption device;
- a plurality of power and data connectors, said plurality of power and data connectors comprises;
  - a plurality of power connectors configured to receive power; and
  - a plurality of data connectors configured to send and receive data;
- a light emitting diode to provide visible light in a plurality of colors;
- an unlock pin code stored in a memory of said portable authentication and encryption device, said unlock pin code is entered using a combination of said plurality of capacitive touch buttons in said keypad, wherein said entered unlock pin code is configured to unlock said portable authentication and encryption device, or authenticate the portable authentication and encryption device;

a self-destruct pin code stored in said portable authentication and encryption device, an entry of said self-destruct pin code is configured to be operable for wiping all sensitive data stored on said portable authentication and encryption device and return said portable authentication and encryption device to a predetermined default state.

* * * * *